July 11, 1972 A. B. WELTY, JR 3,676,059
SULFATE CONTROL IN AMMONIA FLUE GAS DESULFURIZATION
Filed June 1, 1970
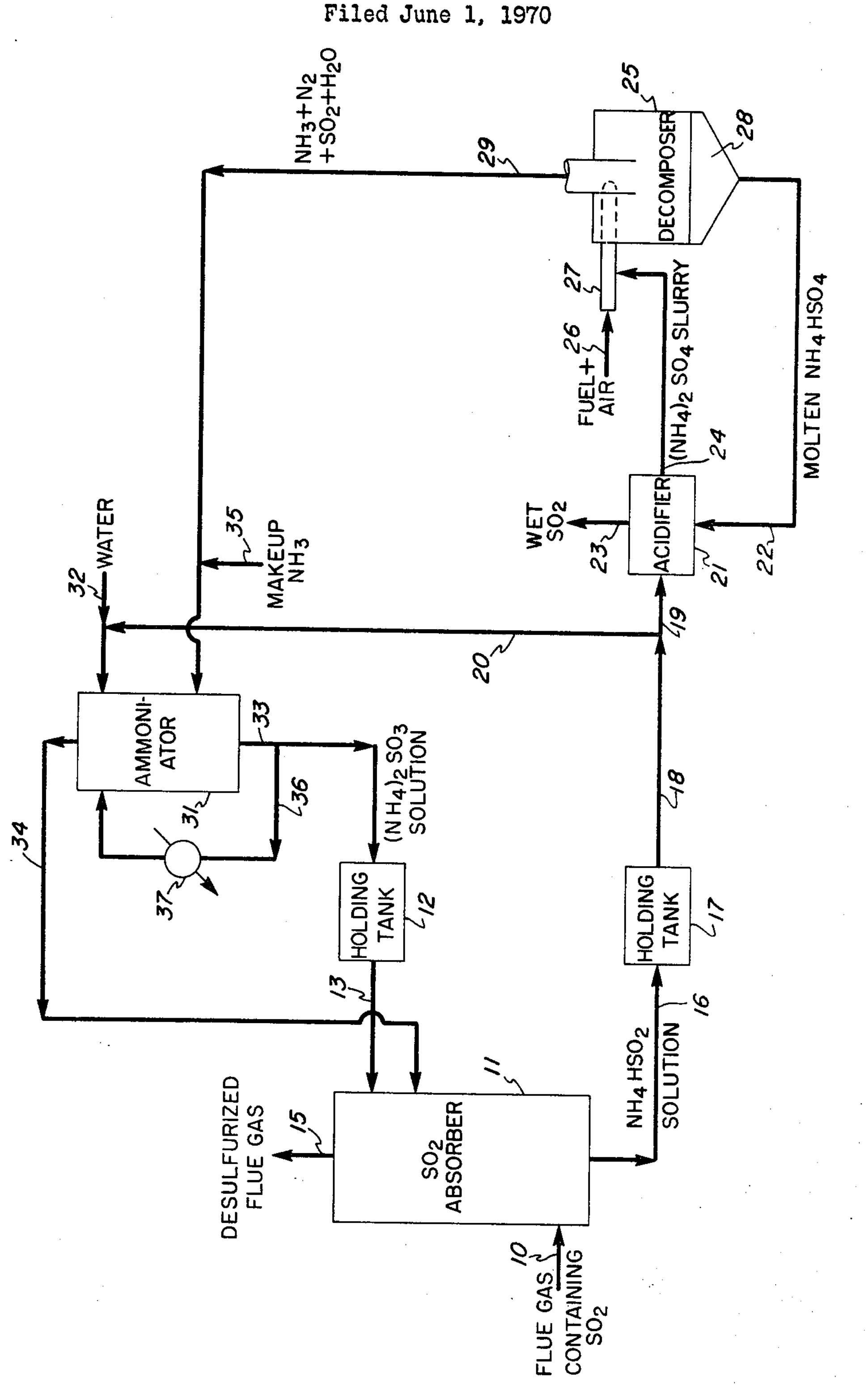
Albert B. Welty, Jr. INVENTORS
BY Louis F. Kreek Jr. ATTORNEY 3,676,059

SULFATE CONTROL IN AMMONIA FLUE GAS DESULFURIZATION

Albert B. Welty, Jr., 225 Watchung Fork, Westfield, N.J. 07090

Filed June 1, 1970, Ser. No. 41,940
Int. Cl. C01b *17/60;* C01c *1/24*
U.S. Cl. 23—2 5 Claims

ABSTRACT OF THE DISCLOSURE

Buildup of sulfate ions in a flue gas desulfurization system employing an aqueous ammoniacal absorbent is prevented by reducing a portion of the sulfate to sulfur dioxide. Sulfur dioxide is removed from flue gas by absorption in an aqueous solution of ammonium sulfite or ammonia. Some oxidation of tetravalent sulfur to the hexavalent state takes place. At least a portion of the absorber effluent solution is regenerated by acidification with ammonium bisulfate to liberate sulfur dioxide and to form an aqueous ammonium sulfate-ammonium bisulfate slurry. This slurry is introduced into a decomposition zone where a major portion of the salt content is decomposed into ammonium bisulfate and ammonia, and a minor portion into a gas mixture comprising ammonia, nitrogen, sulfur dioxide and steam. The ammonium bisulfate thus produced furnishes the bisulfate used for liberation of sulfur dioxide. The gas mixture formed in decomposition is used to ammoniate a second portion of the absorber effluent solution, and thereby produce fresh absorbent solution.

CROSS-REFERENCE TO RELATED APPLICATION

This application is directed to an improvement of the process of the copending application of Lindsay I. Griffin and myself, Ser. No. 869,226, filed Oct. 26, 1969.

BACKGROUND OF THE INVENTION

This invention relates to processes for removal of sulfur dioxide from flue gas, and more particularly to wet processes in which sulfur dioxide is removed by contact with an aqueous absorbent.

Sulfur dioxide has become a major pollutant of the atmosphere, particularly in urban areas. The presence of sulfur dioxide in the atmosphere is due primarily to the combustion of fossil fuels, i.e., coal and oil, which contain sulfur. Electric power plants constitute a major source of sulfur dioxide pollution of the atmosphere.

Various processes have been suggested for removal of sulfur dioxide from flue gas, although none has gained a general industry acceptance to date. These processes may be grouped generally as wet processes and dry processes. Wet processes are those which employ an absorbent solution, usually aqueous, for removal of sulfur dioxide from a gas stream.

A flue gas desulfurization process has several requirements. First, it must be capable of removing most of the sulfur dioxide content of the flue gas, preferably 90% or more of the $SO_2$ present, under widely varying load conditions. Second, it should not create any air or water pollution problems. Third, the process should be easy to operate and maintain. The process should have a low net cost. In many instances this would require the production of a salable by-product. The process should be capable of incorporation into existing power plants if it is to achieve maximum application. This requirement favors wet processes, which operate at a low temperature and therefore can be placed after the conventional air preheater in which incoming air for combustion is heated by the hot flue gas. Dry processes usually require a much higher operating temperature, and therefore must be inserted ahead of the preheater and integrated with the power plant.

Various wet processes using aqueous ammonia or an aqueous ammonium salt which is not fully acidified, such as ammonium sulfite, have been suggested in the art. Such processes are described, for example, in Hixson et al. U.S. Pat. No. 2,405,747, issued Aug. 13, 1946, and Johnstone et al. U.S. Pat. Nos. 2,134,481 and 2,810,627, issued Oct. 25, 1938 and Oct. 22, 1957, respectively. Hixson describes the use of aqueous ammonia as the absorbent. Johnstone U.S. Pat. No. 2,134,481 uses aqueous ammonium sulfite as the absorbent. Another process using ammonium sulfite solution is described in the above-mentioned copending application of Lindsay I. Griffin, Jr. and myself, Ser. No. 869,226, filed Oct. 24, 1969.

One problem which occurs in absorbing sulfur dioxide from flue gas with aqueous ammoniacal solutions is that a portion of the tetravalent sulfur in the absorber is oxidized to the hexavalent state. This is because a small amount of oxygen is present in flue gas. Thus, the absorber effluent solution in the above processes contains a small amount of ammonium bisulfate in addition to a much larger amount of ammonium bisulfite. On regeneration of the effluent solution, the bisulfite is acidified, liberating sulfur dioxide. However, bisulfate does not react with the acidifying agent, and hence hexavalent sulfur in the form of either sulfate or bisulfate ions builds up in the system.

Various means for getting rid of excess sulfate have been disclosed in the art. Hixson et al. U.S. Pat. No. 2,405,747 suggests removing excess ammonium bisulfate from the system and reacting it with limestone to make calcium sulfate. Johnstone et al. U.S. Pat. No. 2,810,627 proposes oxidation and stripping of ammonium sulfite-ammonium bisulfite absorber effluent solution with air to liberate sulfur dioxide and form ammonium sulfate. Since there is not a high demand for either of these materials at the present time, more valuable by-products must be formed from the excess ammonium sulfate.

This invention provides an improved process for the conversion of the hexavalent sulfur formed in the absorber back to sulfur dioxide. This prevents the buildup of sulfate in the system, and enhances the yield of sulfur dioxide as compared to prior art processes, which in turn increases the amount of useful by-product, such as sulfur or sulfuric acid, obtained.

SUMMARY OF THE INVENTION

According to the present invention, sulfur dioxide is removed from a flue gas stream by contacting the stream with an aqueous ammoniacal absorbent solution which is capable of reaction with sulfur dioxide, whereby a major portion of the sulfur dioxide in the flue gas is absorbed in the solution and a minor portion of the tetravalent sulfur in the absorber is oxidized to the hexavalent state; withdrawing a flue gas stream of reduced sulfur dioxide content and an absorber effluent solution comprising ammonium bisulfite and ammonium bisulfate; acidifying at least a portion of the absorber effluent solution with ammonium bisulfate, thereby liberating sulfur dioxide and forming an aqueous mixture containing ammonium sulfate and ammonium bisulfate; evaporating the water content of said aqueous mixture; and decomposing a major portion of the ammonium sulfate-amomnium bisulfate mixture into ammonium bisulfate and ammonia, and a minor portion of the mixture into a gaseous mixture comprising ammonia, nitrogen, water and sulfur dioxide; and absorbing the ammonia and sulfur dioxide in the decomposition products in an aqueous medium to make fresh absorbent solution.

THE DRAWING

This invention will be described in further detail with reference to the accompanying drawing, in which the sole figure is a flow sheet of a preferred embodiment of the process, using an aqueous amomnium sulfite solution as the absorbent.

DESCRIPTION OF THE PREFERRED EMBODIMENT

Sulfur dioxide is removed from flue gas according to this invention by contacting the flue gas with an aqueous ammoniacal absorbent solution in an absorption zone. The flue gas typically contains about 0.2 to 0.3 volume percent of sulfur dioxide, trace quantities of $SO_3$ (about 1 to 3% of the total sulfur oxide content), plus oxygen resulting from the use of excess air for combustion. The ammoniacal solution can be one containing ammonia as its principal solute, such as that described in the aforementioned U.S. Pat. No. 2,405,747, or an aqueous solution comprising ammonium sulfite as the major solute, as illustrated in U.S. Pat. No. 2,134,481 and in the aforementioned U.S. application Ser. No. 869,226. The solution may contain from about 11 to about 18 moles of ammonia per 100 moles of water, from about 8 to about 16 moles of $SO_2$ per 100 moles of water, and small amounts of $SO_3$ with an $NH_3$:$SO_2$ mole ratio greater than 1. Some oxidation of sulfur from the tetravalent to the hexavalent state takes place in the absorption zone, due to the presence of oxygen in the flue gas. A desulfurized flue gas from which at least 90% of the sulfur dioxide has been removed is vented to the atmosphere. An absorbent effluent solution containing amomnium bisulfite as the principal solute, with some ammonium bisulfate due to oxidation in the absorber, is obtained.

The preferred aqueous absorbent solution is one containing ammonium sulfite as the principal solute, such as that described in the above-mentioned copending application Ser. No. 869,226. This absorbent solution contains from about 11 to about 18 moles of $NH_3$ per 100 moles of water, from about 8 to about 16 moles of $SO_2$ per 100 moles of water, plus small amounts of $SO_3$, with an $NH_3$:$SO_2$ mole ratio greater than 1:1, so that there is some unneutralized ammonia available for further reaction with $SO_2$. The $SO_3$ in the solution, which is present principally as sulfate, is due to the oxidation taking place in the absorber and the recirculation of solution, as will be described. Although the fresh absorbent soltuion contains amomnium sulfite as its principal solute and is referred to in this specification as an ammonium sulfite solution, the mole ratio $NH_3$:$SO_2$ does not have to be precisely 2:1, corresponding exactly to ammonium sulfite; indeed, somewhat larger amounts of $SO_2$ are preferably present. Preferred absorber temperatures are in the range of about 30° to about 75° C. Under these conditions some oxidation of tetravalent sulfur to the hexavalent state takes place. The oxidation which occurs in the system results in about 5 to about 20% of the sulfur added to the solution in the absorber being in the hexavalent state; a typical value is about 10%. The absorption zone may be a conventional single stage or multiple stage countercurrent absorber; multiple stage units, as more fully described in the above-mentioned copending application Ser. No. 869,226, is preferred.

The principal reaction taking place in the absorption zone is the conversion of ammonium sulfite to ammonium bisulfite as shown by Equation 1 below. The most important side reaction taking place is the oxidation of ammonium sulfite to ammonium bisulfate, as shown by Equation 2 below.

$$(1)\quad (NH_4)_2SO_3+SO_2+H_2O \rightarrow 2NH_4HSO_3$$

$$(2)\quad (NH_4)_2SO_3+SO_2+O_2+H_2O \rightarrow 2NH_4HSO_4$$

The solution flow rate in the sulfur dioxide absorber is proportioned to the rate of flow of sulfur dioxide in the flue gas in the absorber. The sulfur dioxide flow rate varies with changes in either the total flue gas flow rate or the sulfur dioxide content of the gas. When the source of flue gas is an electric power plant, the gas flow rate is generally variable over the course of a day, depending on the instantaneous load on the power plant. Changes in the sulfur content of the fuel cause changes in the sulfur dioxide content of the flue gas.

Liberation of sulfur dioxide from the absorber effluent solution is the next step in the present process. This step is also similar to the corresponding step in the process of the copending application Ser. No. 869,226. The obsorber effluent solution stream is divided into two portions. The first portion is acidified in order to liberate sulfur dioxide. The second portion is used to prepare fresh absorbent solution, as will be described later.

The first and usually smaller portion of the absorber effluent solution is acidified with hot molten ammonium bisulfate obtained in a subsequent step of the process. The acidifier is preferably operated at about 200° to 225° F. This liberates a gaseous stream comprising sulfur dioxide and water vapor (the latter due to evaporation of part of the water by the sensible heat of the molten ammonium sulfate). This stream may be processed to remove water vapor and to convert the sulfur dioxide to either sulfuric acid or elemental sulfur. An aqueous mixture comprising ammonium sulfate and ammonium bisulfate is formed in the acidifier. Preferably, this aqueous mixture is a slurry containing dissolved and undissolved ammonium sulfate plus dissolved ammonium bisulfate. A slurry is preferable to a solution in order to minimize the amount of water which must be evaporated in subsequent processing. Ammonium sulfate is generally present in greater amount. The ammonium bisulfate present is due to the use of excess ammonium bisulfate for acidification and to the presence of small amounts of ammonium bisulfate in the incoming absorber effluent solution. This ammonium bisulfate goes through the acidifier unreacted.

Liberation of sulfur dioxide in the acidifier is represented by Equation 3 below:

$$(3)\quad NH_4HSO_3+NH_4HSO_4 \rightarrow (NH_4)_2SO_4+SO_2+H_2O$$

The sulfur dioxide liberated in the acidifier can be converted to either sulfur or sulfuric acid according to known means.

The amount of sulfur dioxide liberated in the acidifier is essentially equal to the amount removed from the flue gas in the absorber. Hence, when the absorber effluent solution is divided into two portions, the size of the first portion is such that the $SO_2$ content (as bisulfite) therein is equivalent to the amount of $SO_2$ removed from flue gas in the absorber.

The water content of the aqueous mixture is then evaporated, and the salt content is subjected in a decomposition zone to conditions causing a major portion of the ammonium sulfate in the mixture to be decomposed into ammonium bisulfate and ammonia, and a minor portion of the salt content of the mixture to be totally gasified into ammonia, nitrogen, sulfur dioxide and water vapor. Preferably both evaporation of water and decomposition of salt are carried out in the decomposition zone, although evaporation and decomposition can be carried out in separate vessels as illustrated in the aforementioned U.S. Pat. No. 2,405,747.

The decomposition zone of this invention consists of a single stage decomposer where both the formation of ammonium bisulfate and the decomposition of a minor portion of the feed ammonium sulfate and ammonium bisulfate into ammonia, nitrogen, sulfur dioxide and water take place simultaneously.

Operation of the decomposer according to this invention represents substantial departure from the operation according to copending application Ser. No. 869,226, in which ammonium sulfate is decomposed under milder conditions with the formation of ammonium bisulfate and ammonia, and with the substantial absence of any further decomposition.

Equations 4, 5 and 6 below indicate the principal reactions which are believed to take place in the decomposer. Equation 4, the principal reaction, is the decomposition of ammonium sulfate into ammonium bisulfate and ammonia. Equations 5 and 6 represent secondary decomposition reactions which also take place in the decomposer, namely, the reaction of ammonium sulfate and ammonium bisulfate, respectively, to form the gaseous product mixture of ammonia, nitrogen, sulfur dioxide, and water vapor.

(4) $(NH_4)_2SO_4 \rightarrow NH_4HSO_4 + NH_3$ (5) $3(NH_4)_2SO_4 \rightarrow 4NH_3 + N_2 + 3SO_2 + 6H_2O$ (6) $3NH_4HSO_4 \rightarrow NH_3 + N_2 + 3SO_2 + 6H_2O$ Whether the reaction shown by Equation 5 takes place directly, or merely stepwise as shown by Equations 4 and 6, is not established, and applicant does not wish to be bound by any theory of operation.

Decomposition of ammonium sulfate and ammonium bisulfate into an all gaseous product mixture which includes sulfur dioxide is known, as described for example in Bonfield et al. U.S. Pat. No. 3,282,646, issued Nov. 1, 1966.

The decomposer is maintained at a temperature of about 750° to about 950° F. and a nonoxidizing atmosphere is maintained therein. The nonoxidizing atmosphere is necessary to permit the formation of sulfur dioxide instead of sulfur trioxide. Any desired heat source can be used for the decomposer. U.S. Pat. No. 2,405,747, for example, illustrates the use of superheated steam. Other nonoxidizing gases, as disclosed in U.S. Pat. No. 3,282,646, can also be used as a source of heat. Hot combustion gases formed by the incomplete combustion of a carbonaceous fuel such as natural gas, oil, or coal, constitutes a preferred heat source according to this invention. The aqueous ammonium sulfate-ammonium bisulfate slurry is advantageously injected into a flowing stream of hot nonoxidizing gas. This nonoxidizing gas stream is initially at a temperature considerably above the desired decomposition temperature of 750° to 950° F.; for example, the initial hot gas temperature may be as high as 3000° F. or thereabouts. The slurry becomes entrained in droplet form in the gas stream. Water is evaporated, and then ammonium sulfate and ammonium bisulfate are decomposed as shown by Equations 4, 5 and 6. Both the evaporation of water and the endothermic decomposition which follows causes a substantial drop in the gas stream temperature. Molten ammonium bisulfate is formed as fine droplets, which can be coalesced and collected at the bottom of the decomposer. A gaseous overhead stream containing decomposition products, e.g., ammonia, nitrogen, sulfur dioxide, and water vapor, as well as combustion products present in the entering combustion gas stream, i.e., CO, $CO_2$, and additional nitrogen and water vapor, is removed as an overhead product from the decomposition zone. The ammonium bisulfate, which may contain some unreacted ammonium sulfate, is returned to the acidifier for use as a reagent therein as previously described.

The gaseous overhead product in the decomposer is cooled and is then conveyed to an ammonia absorber or ammoniator where it is used to make up fresh absorbent solution. Makeup ammonia, to replace ammonia lost from the system or decomposed into nitrogen in the decomposer, may be added to this gaseous stream before it enters the ammoniator. The resulting gaseous stream contacts the second portion of the absorbent effluent solution plus makeup water in the ammoniator. The ammonia and sulfur dioxide content of this gaseous stream is absorbed in the aqueous medium, and fresh absorbent solution is obtained as a product. The nitrogen, carbon monoxide, and carbon dioxide present in the entering gas stream may be vented into the atmosphere.

The principal reactions taking place in the ammoniator may be represented by Equations 7, 8 and 9 below:

(7) $NH_4HSO_3 + NH_3 \rightarrow (NH_4)_2SO_3$ (8) $NH_4HSO_4 + NH_3 \rightarrow (NH_4)_2SO_4$ (9) $2NH_3 + SO_2 + H_2O \rightarrow (NH_4)_2SO_3$ As will be seen by Equation 8, some ammonium sulfate is formed in the ammoniator, due to the presence of small amounts of ammonium bisulfate in the absorber effluent solution. The operation of the ammoniator in the present invention is substantially similar to that in the process described in Ser. No. 869,226, except that the entering gas stream herein contains small amounts of sulfur dioxide in addition to ammonia.

The entire process of the present invention is preferably conducted on a continuous basis. When the source of flue gas is an electric power plant, the gas flow rate is generally variable over the course of a day, depending on the instantaneous load of the power plant. The feed rate for fresh absorbent solution entering the absorption zone is approximately proportional to the rate at which sulfur dioxide enters the absorber. It is possible to maintain a substantially constant flow rate in all units of the system except the absorber. This can be done by placing holding tanks in the fresh absorber solution and absorber effluent solution lines, as will be described more fully with respect to the drawings.

It is possible according to the present invention to use aqueous ammonia instead of ammonium sulfite as the absorbent, as previously indicated. Aqueous ammonia has the advantage of providing approximately twice as many chemical equivalents of base per mole of $SO_2$ as ammonium sulfite; the disadvantage of aqueous ammonia is that a small amount of ammonia may be desorbed in the sulfur dioxide absorber and carried into the desulfurized flue gas exit stream. Because of this possibility, and aqueous absorbent solution corresponding approximately to ammonium sulfite is generally preferred over aqueous ammonia. When aqueous ammonia is used as the absorbent, the entire absorber effluent solution may be acidified and the ammoniator omitted as shown in the aforesaid U.S. Pat. No. 2,405,747.

This invention will now be described further with reference to the drawing.

A flue gas stream containing about 0.2 to about 0.3% by volume of sulfur dioxide plus small amounts of sulfur trioxide is introduced via line 10 into sulfur dioxide absorber 11. The flue gas stream is contacted in absorber 11 with fresh aqueous absorbent solution containing ammonium sulfite as its principal solute. This aqueous solution is conveyed from holding tank 12 through feed line 13 to scrubber 11. All of the absorbent solution is shown as entering the top of the scrubber, although the solution may be supplied at two or more vertically spaced locations. The solution rate is substantially proportional to the rate of flow of sulfur dioxide in the flue gas.

Desulfurized flue gas, having about 10% or less of the original sulfur dioxide content, is removed from the absorber 11 through overhead line 15. An aqueous absorber effluent solution comprising ammonium bisulfite with small amounts of ammonium bisulfate present, is removed from the base of absorber 11 through line 16. The ammonium bisulfate is due to the small amount of oxidation of sulfur from the tetravalent to the hexavalent state which takes place in the sulfur dioxide scrubber 11. This absorber effluent solution flows from line 16 into holding tank 17.

An absorber effluent solution stream 18 is withdrawn from holding tank 17. This absorber effluent solution stream is divided into two portions. The first and smaller portion, which is stream 19, is treated to liberate sulfur dioxide. The second and larger portion, stream 20, is used to prepare fresh absorbent solution as will be hereinafter described.

The absorbent effluent solution stream 19 is introduced into acidifier 21, where it is reacted with excess ammonium bisulfate introduced in the molten state through recycle line 22. The sensible heat of the molten ammonium bisulfate stream maintains the acidifier at its desired operating temperature of about 200° to 225° F. Wet sulfur dioxide, i.e., a mixture of sulfur dioxide and water vapor, is liberated in acidifier 21 and withdrawn through overhead line 23. The water vapor may be separated from the sulfur dioxide by known means and the sulfur dioxide converted to either sulfur or sulfuric acid.

An aqueous slurry of ammonium sulfate and ammonium bisulfate, the former present in greater amount, is formed as a byproduct in the acidifier 21. This slurry is withdrawn from the acidifier 21 through line 24, and is introduced into a decomposer 25. A preferred mode of heating the decomposer is by means of hot combustion gases. In the embodiment shown in FIG. 1, a mixture of fuel and air is introduced through line 26 into a refractory lined combustion tube 27, where the fuel is burned. The ammonium sulfate-ammonium bisulfate slurry in line 24 is introduced into the hot combustion gas stream in combustion tube 27 which is formed by combustion of the fuel therein. The water in the slurry is evaporated, and the ammonium sulfate is decomposed into ammonium bisulfate, ammonia, nitrogen, sulfur dioxide and water vapor. The major portion of the ammonium sulfate is decomposed into ammonium bisulfate and ammonia. The ammonium bisulfate is collected in molten form in a pool 28 at the bottom of decomposer 25. This ammonium bisulfate is returned in molten form to the acidifier 21 through line 22. The mixture of combustion gas and gaseous decomposition products is removed from decomposer 25 through overhead line 29. The gas mixture is introduced into the ammonia absorber 31. The gas mixer contacts the second portion of the absorber effluent solution, which is conveyed to the ammonia absorber or ammoniator 31 via line 20. Makeup water is added as required through line 32 and makeup ammonia is added through line 35. The ammonia and sulfur dioxide in the gas mixture react with the ammonium bisulfite to form fresh absorbent solution, containing ammonium sulfite as the principal solute. This fresh absorbent solution is returned to holding tank 12 through line 33. The desired temperature is maintained in ammoniator 31 by recirculating part of the effluent solution through a pumparound circuit which includes recirculation line 36 and cooler 37. Gases which are not absorbed, i.e., nitrogen and carbon monoxide, are removed from the absorber 31 through overhead line 34. These gases are returned to the sulfur dioxide absorber 11 in order to remove any ammonia or sulfur dioxide which may be present.

This invention will now be described further with reference to specific embodiments thereof as shown in the following example.

EXAMPLE

Referring to the drawing, flue gas containing about 0.23% by volume of sulfur dioxide and a trace of $SO_3$ is passed upwardly through sulfur dioxide absorber 11, where it is contacted with a downflowing stream of aqueous absorbent solution. This solution is essentially ammonium sulfite, with some ammonium bisulfite, ammonium sulffate and ammonium bisulfate present, containing typically about 16.4 moles of $NH_3$, 8.3 moles of $SO_2$ and 0.82 mole of $SO_3$ per 100 moles of water and having a pH of 6.6. This absorbent solution is introduced into the absorber 11 vial line 13. Absorber 11 is operated at 122° F. and substantially atmospheric pressure. Desulfurized flue gas is withdrawn overhead via line 15, and absorber effluent solution is withdrawn through line 16 and passed to holding tank 17. The absorber effluent solution is predominantly ammonium bisulfite with some ammonium bisulfate, containing typically about 15.9 moles of $NH_3$, 11.5 moles of $SO_2$ and 1.20 moles of $SO_3$ per 100 moles of water, and having a pH of 5.3.

Absorber effluent solution is withdrawn from holding tank 17 via line 18, and is divided into two streams 19 and 20. Stream 19 flows to acidifier 21, and molten ammonium bisulfate is also introduced into acidifier 21 via line 22. The solution temperature in acidifier 21 is about 200° F. to 225° F. Sulfur dioxide and water vapor are removed overhead via line 23.

An aqueous slurry of ammonium sulfate, with some ammonium bisulfate, containing typically about 20% by volume of solids, passes from acidifier 21 to decomposer 28 via line 24. The ammonium sulfate slurry is contacted in decomposer 25 with a hot combustion gas stream entering through line 26, forming a pool 28 of molten ammonium bisulfate, which is withdrawn from the decomposer via line 22 and returned to the acidifier 21. The ammonia is entrained in the combustion gas exit stream 29, which flows to the ammoniator 31. Makeup ammonia is added via line 35. Some sulfur dioxide is also formed in decomposer 21 as a consequence of the desired breakdown of some of the ammonium bisulfate to keep ammonium bisulfate from accumulating in the system. This $SO_2$ also leaves with the combustion gas exit stream 29.

Ammonia and sulfur dioxide from line 29 plus makeup ammonia from line 35 and ammonium bisulfate solution from line 20 are countercurrently contacted in ammoniator 31, forming absorbent solution which is primarily ammonium sulfite. This solution is passed from ammoniator 31 to surge tank 12 via line 33. Solution is withdrawn from holding tank 12 via line 13 and introduced into the sulfur dioxide absorber as previously described. Combustion gas is withdrawn from absorber 11 via overhead line 15.

Stream quantities in pound moles per hour (except in streams 22 and 24) are shown in Table I below.

TABLE I

Stream quantities in pound moles per hour, reference numerals refer to drawing

| | Constituent | | | | |
|---|---|---|---|---|---|
| Reference numeral | Flue gas | $SO_2$ | $SO_3$ | $NH_3$ | $H_2O$ |
| 10 | [1] 229,300 | 541 | 2 | | (2) |
| 13 | | 1,096 | 109 | 2,181 | 13,300 |
| 15 | [1] 235,000 | 54 | | 70 | (2) |
| 16 | | 1,534 | 160 | 2,111 | 13,300 |
| 19 | | 489 | 51 | 673 | 4,240 |
| 20 | | 1,045 | 109 | 1,438 | 9,060 |
| 23 | | 489 | | | 1,240 |
| 26 | [3] [4] 6,280 | | | | |
| 29 | [3] [5] 6,280 | 51 | | 639 | [6] 3,000 |
| 43 | [3] 6,280 | | | | (2) |
| 35 | | | | 104 | |

[1] Total flow, including $SO_2$ and any $SO_3$ or $NH_3$.
[2] Essentially saturated.
[3] Combustion gas.
[4] Total flow, including water vapor.
[5] Includes water vapor formed by combustion, but does not include $NH^3$ or water introduced in stream 24.
[6] Includes water from stream 24 only. Does not include water vapor in combustion gas (stream 26).

Table II below shows the stream quantities (in pound moles per hour) in streams 22 and 24.

TABLE II

| | Stream | |
|---|---|---|
| Constituent | 22 | 24 |
| Ammonium bisulfate | [1] 890 | [2] 319 |
| Ammonium sulfate in solution | | 270 |
| Ammonium sulfate in suspension | | 352 |
| Water | | 3,000 |

[1] Molten. [2] In solution.

While this invention has been described with particular reference to flue gas, other gases containing sulfur dioxide, such as smelter gas from pyrites and other ore roasting processes can also be desulfurized according to the present invention.

What is claimed is:

1. A process for removing sulfur dioxide from flue gas which comprises:

(a) contacting said flue gas with an aqueous ammoniacal absorbent solution in an absorption zone, whereby a major amount of the sulfur dioxide in said flue gas is absorbed in said solution and a minor amount of the tetravalent sulfur in said absorption zone is oxidized to the hexavalent state;

(b) withdrawing a flue gas stream of reduced sulfur dioxide content and an absorber effluent solution comprising ammonium bisulfite and ammonium bisulfate;

(c) acidifying at least a portion of said absorber effluent solution with ammonium bisulfate, thereby liberating sulfur dioxide and forming an aqueous mixture containing ammonium sulfate;

(d) evaporating the water in said aqueous mixture;

(e) heating the ammonium sulfate formed in step (c) to a temperature of about 750° to about 950° F. in a single stage decomposition zone whereby molten ammonium bisulfate and a gaseous product mixture comprising ammonia, nitrogen, and sulfur dioxide are formed;

(f) withdrawing said molten ammonium bisulfate and said gas product mixture from said decomposition zone;

(g) returning said ammonium bisulfate to step (c) for acidification of said absorber effluent solution; and (h) dissolving the ammonia and sulfur dioxide in said gaseous product mixture in an aqueous medium, thereby making fresh absorbent solution for use in step (a).

2. A process according to claim 1 in which a pool of molten ammonium bisulfate product is collected and in which the recomposition temperature is controlled in response to the liquid level in said pool.

3. A process according to claim 1 in which said aqueous ammoniacal absorbent solution comprises ammonia as the principal solute.

4. A process according to claim 1 in which:

(i) said aqueous ammoniacal absorbent solution comprises ammonium sulfite as the principal solute;

(j) said absorber effluent solution is divided into two portions;

(k) the first portion of said absorber effluent solution is acidified with ammonium bisulfate; and (l) the second portion of said absorber effluent solution is the aqueous medium in which ammonia and sulfur dioxide are dissolved in making fresh absorbent solution.

5. A process according to claim 1 in which said ammonium sulfate is decomposed under nonoxidizing conditions.

References Cited

UNITED STATES PATENTS

| | | | |
|---|---|---|---|
| 1,740,342 | 12/1929 | Hansen | 23—178 S |
| 2,021,558 | 11/1935 | Lee et al. | 23—178 S |
| 2,082,006 | 6/1937 | Johnstone | 23—178 S |
| 2,405,747 | 8/1946 | Hixon et al. | 23—178 R |
| 2,676,090 | 4/1954 | Johnstone | 23—178 R |
| 3,282,646 | 11/1966 | Bonfield et al. | 23—193 X |
| 3,321,275 | 5/1967 | Furkert et al. | 23—178 R |

OSCAR R. VERTIZ, Primary Examiner

C. B. RODMAN, Assistant Examiner

U.S. Cl. X.R.

23—119, 178